United States Patent
Srivastava et al.

(10) Patent No.: US 12,079,061 B2
(45) Date of Patent: Sep. 3, 2024

(54) POWER MANAGEMENT FOR PERIPHERAL COMPONENT INTERCONNECT

(71) Applicant: QUALCOMM Incorporated, San Diego, CA (US)

(72) Inventors: Prakhar Srivastava, Lucknow (IN); Santhosh Reddy Akavaram, Hyderabad (IN); Ravindranath Doddi, Hyderabad (IN); Ravi Kumar Sepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/959,996

(22) Filed: Oct. 4, 2022

(65) Prior Publication Data
US 2024/0111354 A1 Apr. 4, 2024

(51) Int. Cl.
G06F 1/32 (2019.01)
G06F 1/3234 (2019.01)
G06F 1/3287 (2019.01)
G06F 13/42 (2006.01)

(52) U.S. Cl.
CPC .......... G06F 1/3278 (2013.01); G06F 1/3253 (2013.01); G06F 1/3287 (2013.01); G06F 13/4221 (2013.01); G06F 13/4282 (2013.01); G06F 2213/0026 (2013.01)

(58) Field of Classification Search
CPC .......................... G06F 1/3278; G06F 13/4282
See application file for complete search history.

(56) References Cited

U.S. PATENT DOCUMENTS

| | | | | |
|---|---|---|---|---|
| 6,018,803 A * | 1/2000 | Kardach | ............... | G06F 1/3215 714/39 |
| 7,136,953 B1 * | 11/2006 | Bisson | ............... | G06F 13/4018 710/29 |
| 7,426,597 B1 * | 9/2008 | Tsu | .................... | G06F 13/4018 710/29 |
| 7,469,311 B1 * | 12/2008 | Tsu | .................... | G06F 13/4018 710/29 |
| 11,836,101 B2 * | 12/2023 | Das Sharma | ......... | G06F 13/362 |

(Continued)

OTHER PUBLICATIONS

International Search Report and Written Opinion—PCT/US2023/071354—ISA/EPO—Oct. 23, 2023.

(Continued)

*Primary Examiner* — Jaweed A Abbaszadeh
*Assistant Examiner* — Cheri L Harrington
(74) *Attorney, Agent, or Firm* — Loza & Loza, LLP/Qualcomm

(57) ABSTRACT

A new peripheral component interconnect express (PCIe) link state can enhance power saving capabilities of a PCIe link operating in a flow control unit (FLIT) mode. A device can operate a data link with a host in a FLIT mode using fixed-sized packets, the data link being in a partial width link state (PLS) in which a first set of lanes of the data link are in an electrical idle state and a second set of lanes of the data link are in an active state available for data traffic with the host. The device can transition one or more lines of the second set of lanes from the PLS to a partial width standby link state (PSLS) in which the one or more lines of the second set of lanes are in a standby state that has lower power consumption than the active state.

20 Claims, 11 Drawing Sheets

(56) References Cited

U.S. PATENT DOCUMENTS

| | | | |
|---|---|---|---|
| 2011/0177847 A1* | 7/2011 | Huang | H04W 52/0216 |
| | | | 455/574 |
| 2014/0006673 A1* | 1/2014 | Varma | G06F 13/4027 |
| | | | 710/307 |
| 2014/0095751 A1* | 4/2014 | Iyer | G06F 13/42 |
| | | | 710/107 |
| 2014/0101468 A1* | 4/2014 | Narayanan | G06F 1/3287 |
| | | | 713/320 |
| 2016/0179730 A1* | 6/2016 | Halleck | G06F 13/124 |
| | | | 710/105 |
| 2016/0191034 A1* | 6/2016 | Wagh | G06F 1/3296 |
| | | | 327/233 |
| 2017/0185502 A1 | 6/2017 | Iyer et al. | |
| 2020/0226084 A1* | 7/2020 | Das Sharma | H04L 45/24 |
| 2021/0041929 A1 | 2/2021 | Connor et al. | |
| 2021/0042248 A1* | 2/2021 | Das Sharma | G06F 13/4282 |
| 2022/0116138 A1 | 4/2022 | Das Sharma | |

OTHER PUBLICATIONS

PCI Express: "PCI Express Base Specification Revision 6.0", Peripheral Component Interconnect Special Interest Group, 3855 SW 153RD Drive Beaverton, OR 97003, US, Dec. 16, 2021, XP040726468, 1923 Pages.

* cited by examiner

POWER MANAGEMENT FOR PERIPHERAL COMPONENT INTERCONNECT

TECHNICAL FIELD

The technology discussed below relates generally to peripheral component interconnect express (PCIe) devices, and more particularly, to techniques for managing link power consumption of PCIe devices.

INTRODUCTION

High-speed interfaces are frequently used between circuits and components of mobile wireless devices and other complex systems. For example, certain devices may include processing, communications, storage, and/or display devices that interact with one another through one or more high-speed interfaces. Some of these devices, including synchronous dynamic random-access memory (SDRAM), may be capable of providing or consuming data and control information at processor clock rates. Other devices, e.g., display controllers, may use variable amounts of data at relatively low video refresh rates.

The peripheral component interconnect express (PCIe) standard is a high-speed interface that supports a high-speed data link capable of transmitting data at multiple gigabits per second. The PCIe interface also has multiple standby modes for when a link is inactive. PCIe can provide lower latency and higher data transfer rates compared to parallel buses. PCIe can be used for communication between a wide range of different devices. Typically, one device, e.g., a processor or hub, acts as a host, that communicates with multiple devices, referred to as endpoints, through PCIe links (data links) The peripheral devices or components may include graphics adapter cards, network interface cards (NICs), storage accelerator devices, mass storage devices, Input/Output (I/O) interfaces, and other high-performance peripherals.

A connection between any two PCIe devices is referred to as a link A PCIe link is built around a duplex, serial (1-bit), differential, point-to-point connection referred to as a lane. With PCIe, data is transferred over two signal pairs: two lines (wires, circuit board traces, etc.) for transmitting and two lines for receiving. The transmitting and receiving pairs are separate differential pairs for a total of four data lines per lane. The link encompasses a set of lanes, and each lane is capable of sending and receiving data packets simultaneously between the host and the endpoint. A PCIe link, as currently defined, can scale from one to 32 separate lanes. Usual deployments have 1, 2, 4, 8, 12, 16, or 32 lanes, which may be labeled as x1, x2, x4, x8, x12, x16, or x32, respectively, where the number is effectively the number of lanes. In one example, a PCIe x1 implementation has four lines to connect one wire-pair lane in each direction while a PCIe x16 implementation has 16 times that amount for 16 lanes or 64 lines.

There are various link power management states such as L0, L0s, and L1 that a PCIe physical link can enter and exit in response to state power management activities. These link power management states allow PCIe devices to use power more efficiently depending on the traffic condition or state of the PCIe link.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, a method of operating an endpoint for data communication is disclosed. The method includes operating a data link with a host in a flow control unit (FLIT) mode using fixed-sized packets, the data link being in a partial width link state (PLS) in which a first set of lanes of the data link are in an electrical idle state and a second set of lanes of the data link are in an active state available for data traffic with the host. The method further includes transitioning one or more lines of the data link second set of lanes from the PLS to a partial width standby link state (PSLS) in which the one or more lines of the second set of lanes are in a standby state that has lower power consumption than the active state.

In one example, an endpoint for a peripheral component interconnect express (PCIe) link is provided. The endpoint includes an interface circuit configured to provide an interface with the PCIe link connected with a host. The endpoint further includes a controller configured to operate the PCIe link in a flow control unit (FLIT) mode using fixed-sized packets. The PCIe link is in a partial width link state (PLS) in which a first set of lanes of the PCIe link are in an electrical idle state and a second set of lanes of the PCIe link are in an active state available for data traffic with host. The controller is further configured to transition one or more lines of the second set of lanes PCIe link from the PLS to a partial width standby link state (PSLS) in which the one or more of the second set of lanes are in a standby state that has lower power consumption than the active state.

In one example, a host for a peripheral component interconnect express (PCIe) link is provided. The host includes an interface circuit configured to provide an interface with the PCIe link connected with an endpoint. The host further includes a controller configured to operate the PCIe link in a flow control unit (FLIT) mode using fixed-sized packets. The PCIe link is in a partial width link state (PLS) in which a first set of lanes of the PCIe link are in an electrical idle state and a second set of lanes of the PCIe link are in an active state available for data traffic with the endpoint. The controller is further configured to transition one or more lines of the second set of lanes PCIe link from the PLS to a partial width standby link state (PSLS) in which the one or more of the second set of lanes are in a standby state that has lower power consumption than the active state.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
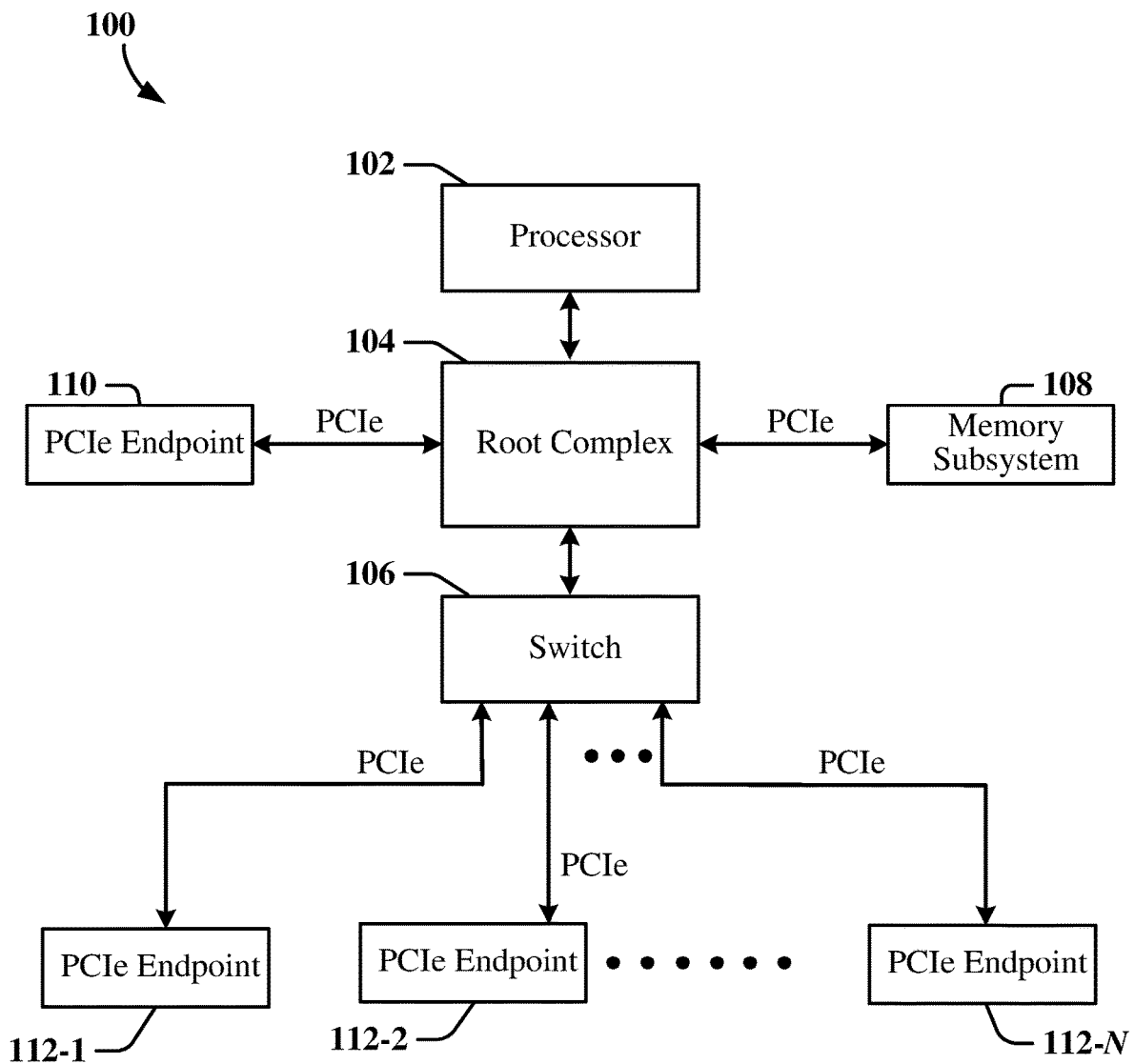
FIG. 1 is a block diagram of a computing architecture with peripheral component interconnect express (PCIe) interfaces suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

The recent peripheral component interconnect express (PCIe) specification (e.g., PCIe 6.0) can use Flow Control Unit (FLIT) encoding to improve the latency and efficiency of a PCIe link. When a PCIe link is in a FLIT mode, error correction operates on fixed-sized packets (flits). At the physical layer of a PCIe link, units of data transfer are flits. Further, PCIe 6.0 introduces a partial width link state (L0p) that is available in FLIT mode. In L0p, some lanes (i.e., partial width) may be in an electrical idle mode. When a lane is electrically idle, the corresponding line driver can be set in a static or high impedance state, and the differential voltage of the lane can be fixed (e.g., 0 volt). In some aspects, the standby link state L0s is not available in FLIT mode. Therefore, the L1 state becomes the power-saving state with the least resume latency (e.g., in order of 64 us) for L0p. In FLIT mode, the transition to a power-saving state L1 from L0p is based on triggering of an L1 state inactivity timer. However, for unidirectional transfers (i.e., only receive (RX) or only transmit (TX) lines are engaged), both the TX as well as RX lines are kept in the active L0p state because both devices connected by a PCIe link (e.g., a host and an endpoint) need to transition to L1. Since L0s is not available in FLIT mode, no power can be saved by transitioning the transmitter (e.g., a host or endpoint) alone to a low power state, without any negotiation or handshake sequence that is needed to transition the device to the other available low power state (e.g., L1).

In an exemplary handshake sequence, the physical layer (PHY) of a PCIe device (e.g., an endpoint) can detect a certain idle time period (e.g., based on a PCIe inactivity timer) on a PCIe link. The idle time period can be implementation specific (e.g., 7 microseconds (tis) to 10 μs). Then, the device blocks new outbound PCIe transactions (e.g., PCIe traffic) to the system (e.g., host). The PCIe device can keep sending a PM_Active_State_Request_L1 data link layer packet (DLLP) to the system side until the device receives a PM_Request_ACK from the system side. When the system receives the PM_Active_State_Request_L1 DLLP, the system blocks new transactions to the device, and keeps sending the PM_Request_ACK until the system receives an electrical idle ordered set. When the device receives the PM_Request_ACK, the device sends an electrical idle ordered set, and puts the device's transmitter into an electrical idle state. When the system receives the electrical idle ordered set, the system puts its transmitter into electrical idle. At this point, the PCIe link is in the L1 state. Either the system or device can initiate an exit from the L1 state.

Aspects of the disclosure provide techniques for implementing a new PCIe link state to enhance power saving capabilities of a PCIe link in FLIT mode. The techniques enable a host and an endpoint to enter the new link state (referred to as L0ps in this disclosure) independently from L0p in FLIT mode. In some aspects, a PCIe link in L0p state can quickly enter (e.g., based on an L0ps inactivity timer) and recover from the L0ps state without going through a recovery state. In some aspects, a lane can enter the L0ps state after receiving an electrical idle ordered set (EIOS) for the PCIe lane. In some aspects, when a lane exits from the L0ps state back to the L0p state, the lane re-establishes bit lock, symbol lock, or block alignment, and performs lane-to-lane de-skew. While the lanes of a multi-lane PCIe link can transmit data symbols simultaneously, lane-to-lane skew occurs when the data symbols of different lanes arrive at the receiver at different times The arrival time difference is referred to as lane-to-lane skew. For example, a device exiting L0ps can de-skew the lane by sending exit patterns on the idle lanes to train and de-skew them. As one example, an exit pattern can include an electrical idle exit ordered set (EIEOS) and a fast training sequence (FTS).

In some aspects, a TX and RX line pair on a PCIe lane can switch to the L0ps state independently (e.g., not simultaneously). In some aspects, the TX line and RX line can be in the L0ps state independently based on separate inactivity timeouts, without any handshaking between the host and endpoint.

FIG. 1 is a block diagram of an exemplary computing architecture using PCIe interfaces. The computing architecture 100 operates using multiple high-speed PCIe interface serial links A PCIe interface may be characterized as an apparatus comprising a point-to-point topology, where separate serial links connect each device to a host, which can be referred to as a root complex 104. In the computing architecture 100, the root complex 104 couples a processor 102 to memory devices, e.g., the memory subsystem 108, and a PCIe switch circuit 106. In some instances, the PCIe switch circuit 106 includes cascaded switch devices. One or more PCIe endpoint devices 110 may be coupled directly to the root complex 104, while other PCIe endpoint devices 112-1, 112-2, . . . 112-N may be coupled to the root complex 104 through the PCIe switch circuit 106. The root complex 104 may be coupled to the processor 102 using a proprietary local bus interface or a standards defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 can support multiple PCIe ports.

The root complex 104 may control communication between the processor 102 and the memory subsystem 108 which is one example of an endpoint. The root complex 104 (host) also controls communication between the processor 102 and other PCIe endpoint devices 110, 112-1, 112-2, . . . 112-N. The PCIe interface may support full-duplex communication between any two endpoints, with no inherent limitation on concurrent access across multiple endpoints. Data packets may carry information through any PCIe link In a multi-lane PCIe link, packet data may be striped across multiple lanes. The number of lanes in the multi-lane link may be negotiated during device initialization and may be different for different endpoints.

When one or both traffic directions of the lanes of the PCIe links are being underutilized by low bandwidth applications that could be adequately served by fewer lanes, then the root complex 104 and endpoint may operate the link with more or fewer transmit lines and receive lines in one or both directions. In some aspects, a host (e.g., root complex 104) and an endpoint can operate in FLIT mode and change between partial width link states (e.g., L0p and L0ps) based on the traffic condition of the link.

In some aspects, the computing architecture 100 may be implemented based on the PCIe M.2 Specification. The M.2 form factor can be used for mobile adapters. The M.2 enables expansion, contraction, and higher integration of functions onto a single form factor module solution. For example, any of the PCIe endpoints described above relation to FIG. 1 can be implemented as an M.2 adapter, and the root complex 104 can be implemented as an M.2 platform.

Figure 2:
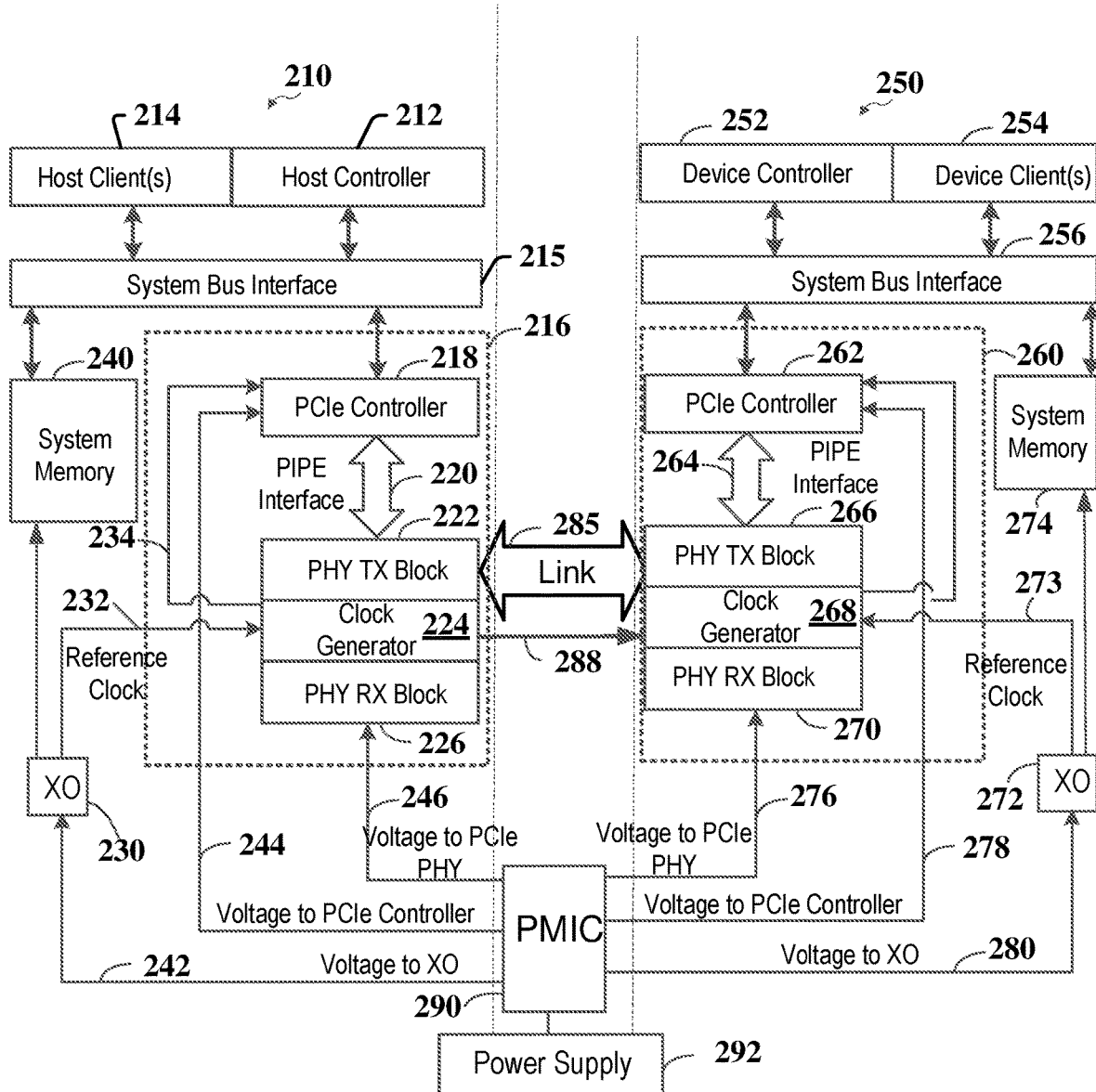
FIG. 2 is a block diagram of a system including a host system and an endpoint device system according to aspects of the present disclosure.

FIG. 2 is a block diagram of an exemplary PCIe system in which aspects of the present disclosure may be implemented. The system 205 includes a host system 210 and an endpoint device system 250, which may be the same as the host and endpoints of FIG. 1. For example, the host system 210 may be a PCIe M.2 platform, and the endpoint device system 250 may be an M.2 adapter. The host system 210 may be integrated on a first chip (e.g., system on a chip or SoC), and the endpoint device system 250 may be integrated on a second chip. Alternatively, the host system and/or endpoint device system may be integrated in first and second packages, e.g., SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as described further below.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of transmit lines or the number of receive lines based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer, and control flow functions.

The host system memory 240 and the endpoint system memory 274 at the endpoint may be configured to contain registers for the status of each transmit line and receive line of the PCIe link 285. The transmit lines may be configured as differential transmit line pairs and the receive lines may be configured as differential receive line pairs.

The endpoint device system 250 also includes an oscillator (e.g., crystal oscillator) 272 configured to generate a stable reference clock signal 273 for the endpoint system memory 274. In the example in FIG. 2, the clock generator 224 at the host system 210 is configured to generate a stable reference clock signal 273, which is forwarded to the endpoint device system 250 via a differential clock line 288 by the PHY RX block 226. At the endpoint device system 250, the PHY RX block 270 receives the endpoint (EP) reference clock signal on the differential clock line 288, and forwards the EP reference clock signal to the clock generator 268. The EP reference clock signal may have a frequency of 100 MHz, but is not limited to such frequency. The clock generator 268 can be configured to generate multiple clock signals based on the EP reference clock signal from the differential clock line 288, as discussed further below. In this regard, the clock generator 268 may include multiple phase-locked loops (PLLs), in which each PLL generates a respective one of the multiple clock signals by multiplying up the frequency of the EP reference clock signal.

The system 205 also includes a power management integrated circuit (PMIC) 290 coupled to a power supply 292 e.g., mains voltage, a battery, or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244, and 246 may be programmable, in which the PMIC 290 is configured to set the voltage levels (corners) of the voltages 242, 244, and 246 according to instructions (e.g., from the host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278, and 276 may be programmable, in which the PMIC 290 is configured to set the voltage levels (corners) of the voltages 280, 278, and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244, and 246 and a second PMIC for generating voltages 280, 278, and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. At the PCIe interface circuit 216, the PCIe controller 218 may perform transaction layer and data link layer functions on the data e.g., packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g., packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generate a clock based on the EP reference clock through a differential clock line 288, and input the clock to the PCIe controller 262 to control time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

In some aspects, the host system 210 and endpoint system 250 can operate the PCIe link 285 in FLIT mode and switch the link 285 between a partial width link state (e.g., L0p) and a standby state (e.g., L0ps) in FLIT mode without going through a recovery state.

Figure 3:
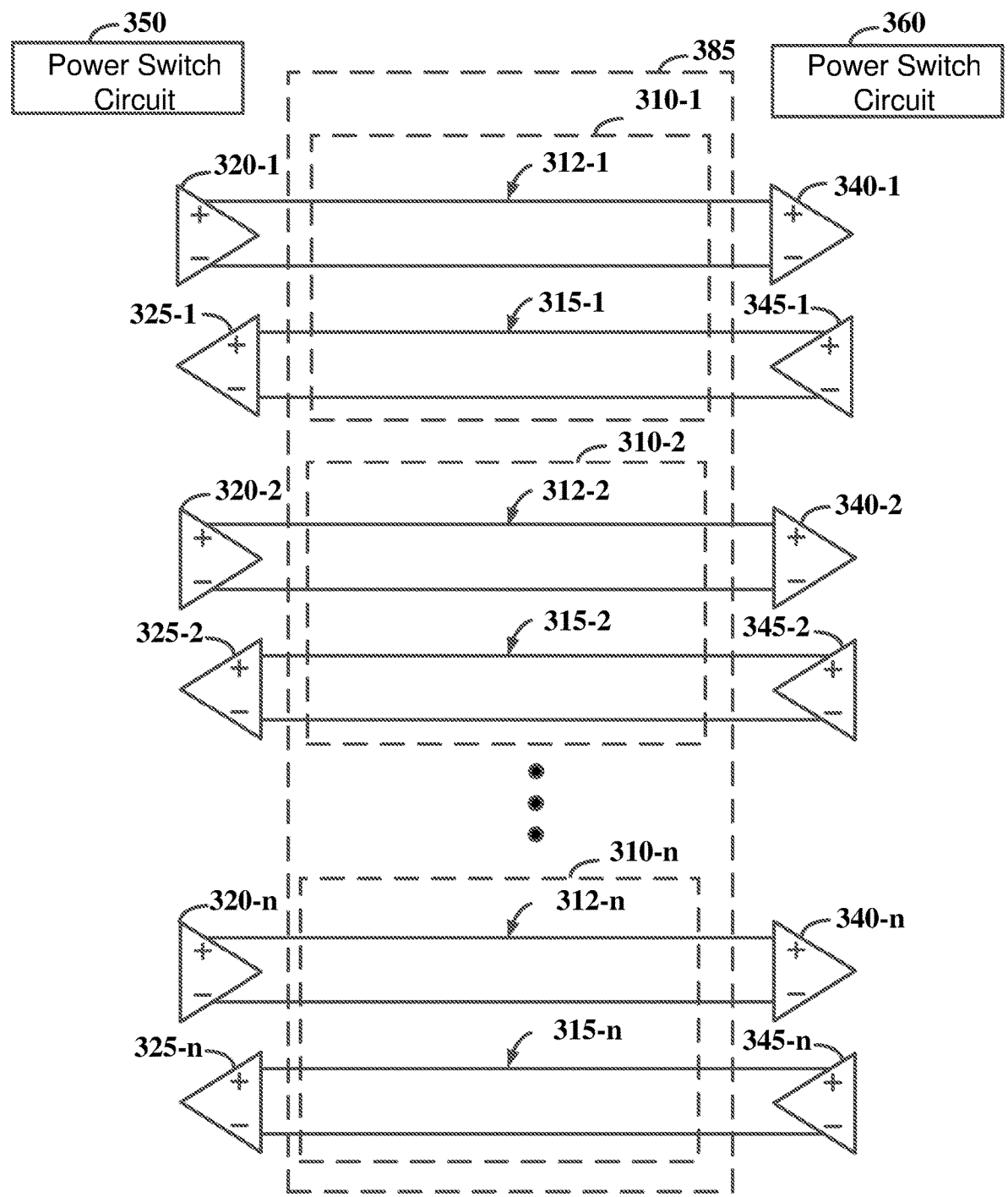
FIG. 3 is a diagram of lanes and corresponding drivers in a PCIe link according to aspects of the present disclosure.

FIG. 3 is a diagram of exemplary lanes in a link 385 that may be used in the system of FIG. 1 and FIG. 2. For example, the link 385 may be implemented as the PCIe link 285 of FIG. 2. In this example, the link 385 includes multiple lanes 310-1 to 310-$n$, in which each lane includes a respective first differential line pair 312-1 to 312-$n$ for sending data from the host system 210 to the endpoint device system 250, and a respective second differential line pair 315-1 to 315-$n$ for sending data from the endpoint device system to the host system 210. From the perspective of the host system, the first lane 310-1 is dual simplex, with a first differential line pair 312-1 as transmit lines and a second differential line pair 315-1 as receive lines. From the perspective of the endpoint device system, the first lane 310-1 has receive lines and transmit lines. The first differential line pairs 312-1 to 312-$n$ and the second differential line pairs 315-1 to 315-$n$ may be implemented with metal traces on a substrate (e.g., printed circuit board), in which the host system may be integrated on a first chip mounted on the substrate, and the endpoint device is integrated on a second chip mounted on the substrate. Alternatively, the link may be implemented through an adapter card slot (e.g., PCIe M.2 slot), a cable, or a combination of different media. The link may also include an optical portion in which the PCIe packets are encapsulated within a different system. In this example, when data is sent from the host system to the endpoint device system across multiple lanes, the PHY TX block 222 may include logic for partitioning the data among the lanes. Similarly, when data is sent from the endpoint device system to the host system 210 across multiple lanes, the PHY TX block 266 may include logic for partitioning the data among the lanes.

The PHY TX block 222 of the host system 210 shown in FIG. 2 may be implemented to include a transmit driver 320-1 to 320-$n$ to drive each first differential line pair 312-1 to 312-$n$ to transmit data, and the PHY RX block 270 of the endpoint device system 250 shown in FIG. 2 may be implemented to include a receiver 340-1 to 340-$n$ (e.g., amplifier) to receive data from each second differential line pair 312-1 to 312-$n$. Each transmit driver 320-1 to 320-$n$ is configured to drive the respective differential line pair 312-1 to 312-$n$ with data, and each receiver 340-1 to 340-$n$ is configured to receive data from the respective first differential line pair 312-1 to 312-$n$. Also, in FIG. 2, the PHY TX block 266 of the endpoint device system 250 may include a transmit driver 345-1 to 345-$n$ for each second differential line pair 315-1 to 315-$n$, and the PHY RX block 226 of the host system 210 may include a receiver 325-1 to 325-$n$ (e.g., amplifier) for each second differential line pair 315-1 to 315-$n$. Each transmit driver 345-1 to 345-$n$ is configured to drive the respective second differential line pair 315-1 to 315-$n$ with data, and each receiver 325-1 to 325-$n$ is configured to receive data from the respective second differential line pair 315-1 to 315-$n$.

In certain aspects, the width of the link 385 can be scalable to match the capabilities of the host system and the endpoint. The link may use one lane 310-1 for an x1 link, two lanes, 310-1, 310-2 for an x2 link, or more lanes for wider links up to n lanes from 310-1 to 310-$n$. Currently, links (x1, x2, x4, x8, x16, and x32) are defined for 1, 2, 4, 8, 16, and 32 lanes, although a different number of lanes may be used to suit particular implementations.

In one example, the host system 210 may include a power switch circuit 350 configured to individually control power to the transmit drivers 320-1 to 320-$n$ and the receivers 325-1 to 325-$n$ from the PMIC 290. Therefore, in this example, the number of drivers and receivers that are powered on scales with the width of the link 385. Similarly, the endpoint device system 250 as was shown in FIG. 2 may include a power switch circuit 360 configured to individually control power to the transmit drivers 345-1 to 345-$n$ and the receivers 340-1 to 340-$n$ from the PMIC 290. In this way, the host system can set a number of the plurality of drivers to be selectively powered by the power switch circuit to change a number of active transmit lines and/or receive lines based on the number of lines that are powered (active) or electrically idle. With differential signaling, the lines can be set as active or standby in pairs. In some aspects, the transmit lines and receive lines of a differential pair can be independently set as active or standby.

ASPM States

Figure 4:
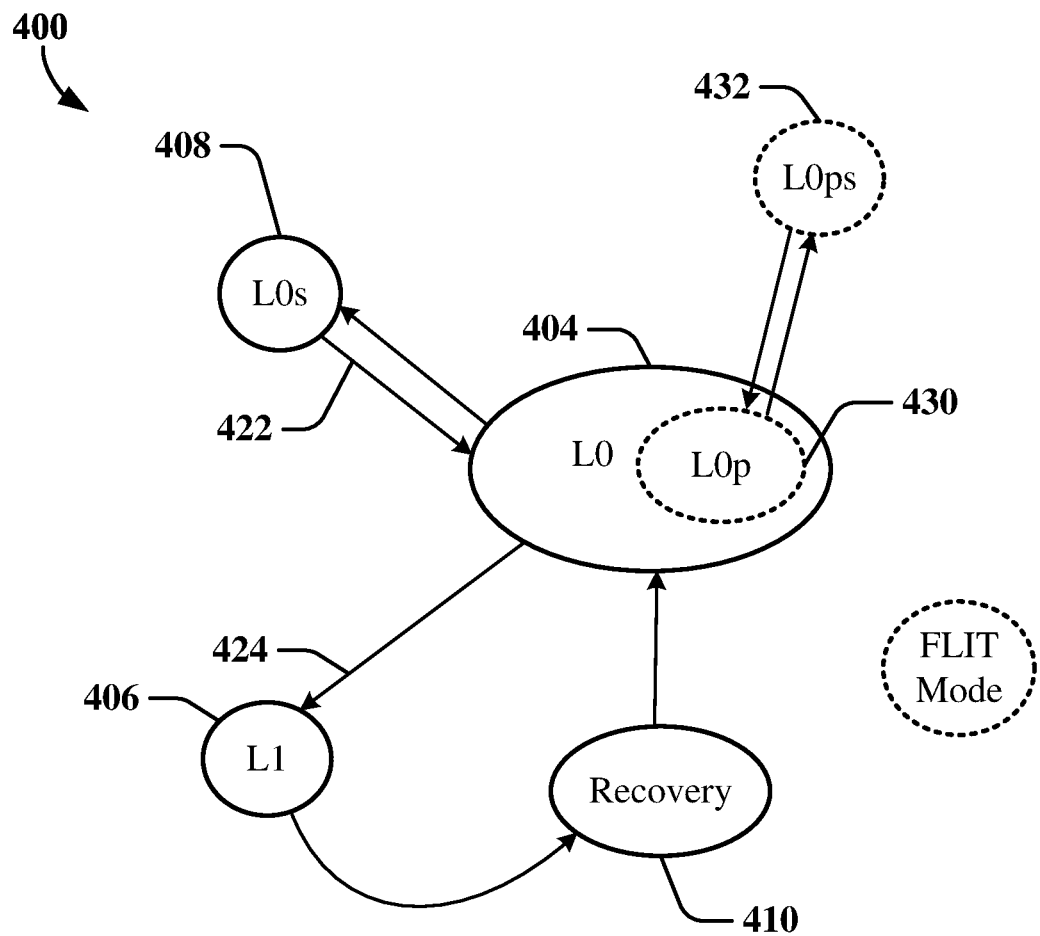
FIG. 4 is a state diagram illustrating the operation of a power management state machine according to aspects of the present disclosure.

FIG. 4 is a diagram 400 illustrating the operation of a power management state machine in accordance with some aspects disclosed herein. In some aspects, a PCIe system (e.g., system 205) can manage power using the Active State Power Management (ASPM) protocol. The ASPM protocol is a power management mechanism for PCIe devices to reduce power usage based on link activity detected over the PCIe link between a host (e.g., the root complex) and an endpoint PCIe device. The state diagram 400 shows some PCIe link states that are consistent with the Link Training and Status state machine (LTSSM) as defined for PCIe, and other link states may be omitted for brevity. In this example, the link can operate in an L0 state 404 (i.e., active link operation state) where data can be transferred over a PCIe link in both directions. In L0, a PCIe device (e.g., a host or an endpoint) may be active and responsive to PCIe transactions, and/or may request or initiate a PCIe transaction.

FIG. 4 also shows a standby state L1 406 that is defined in the PCIe specification. As shown, the L1 state 406 is accessible through a connection to the L0 state 404. An ASPM state change may be initiated when conditions on a link dictate or suggest that a transition between states is appropriate. Both communication partners (e.g., a host and an endpoint) of the link may initiate power state change requests when conditions are right (e.g., idle or low data traffic).

When the link is idle (e.g., for a short time interval between data bursts or no data traffic for a time interval greater than a predetermined threshold), the link may be taken from the L0 state to a standby state L0s 408, which is accessible only through the L0 state. In PCIe, L0s 408 is a power saving state accessible from L0. The link can also change to the L1 state 406, which is a standby state with a higher exit latency than the L0s state 402 such that it takes a longer time to go back to L0 from L1 than from L0s. However, L1 can provide more power saving than L0s. In some aspects, the link can return from L1 to L0 through a recovery state 410. In the recovery state, devices (e.g., a host and an endpoint) using the link can exchange training sequences to negotiate various link parameters, including for example lane polarity, link/lane numbers, equalization parameters, data rate, and so on. The exit latency of L0s and L1 refers to the time it takes for the device to go back to the L0 state. When a device (e.g., a host or endpoint) enters L0s, the transmitting device can send an electrical idle ordered set (EIOS) to the receiving device, then turn off power to its transmitter. When a device returns from L0s to L0, the device can transmit a specific number of small ordered sets known as Fast Training Sequences (FTS) in the PCIe specification such that the receiver can regain receiver lock and is able to receive traffic on the link.

In L0s, data may be transferred in both directions or one direction only, so that two devices (e.g., host and endpoint) connected by a link can each independently set their transmitters to idle. In some aspects, the L0s state can serve as a low latency standby state. Power saving techniques available during L0s can include, but are not limited to, powering down at least a portion of transceiver circuitry as well as the clock gating of at least the link layer logic. In L0s, device discovery and bus configuration processes may be implemented before the link transitions 422 from L0s to L0.

In L1, no data is being transferred through the link so that portions of the PCIe transceiver logic and/or PHY circuit can be turned off or disabled to achieve higher power savings than achievable in L0s. For example, a PCIe device can shut down most of the link transceiver circuitry and/or the PLL. The PCIe device can also use apply clock gating (i.e., reduce the clock rate) to most PCIe architecture logic. The L1 state is a primary standby state with higher latency and power saving than L0s. The L1 state may be entered through a transition 424 from L0 when a PCIe device determines that there are no outstanding PCIe requests or pending transactions or traffic. In some examples, power consumption in L1 may be reduced by disabling or idling transceivers in PCIe bus interfaces, disabling, gating, or slowing clocks used by the PCI device, and disabling PLL circuits used to generate clocks used to receive data. A PCIe device may make the transition 424 to L1 through the operation of a hardware controller or some combination of operating system and hardware control circuits.

In some aspects, the ASPM protocol can determine whether to transition to L0s or L1 based on a finite time interval or a threshold defined as the L0s/L1 entry latency. For example, whenever the PCIe link is inactive for the given L0s or L1 entry latency duration, a PCIe controller may request a link partner to enter a lower-power or standby link state (L0s or L1) in order to save power. In some instances, the L0s entry latency duration and L1 entry latency duration can be chosen based on overall system parameters, activity, and/or pending operations. The ASPM state machine may initiate a transition to a low power state (e.g., L0s or L1) after an observed link inactivity time. The particular entry latency duration may be adapted to suit different system architectures and device characteristics. In some aspects, the packet latency between data read/write requests in a PCIe interface can vary in some implementations, between e.g., 1 μs and 40 μs. In general, L0s entry latency is shorter than L1 entry latency.

FLIT Mode

In some aspects, a PCIe link can operate in FLIT mode that can improve the latency and efficiency of the PCIe link by performing error correction on fixed-sized packets (flits). A partial width link state L0p 430 is available in FLIT mode. In L0p, some lanes of a link may be in an electrical idle (EI) state while other lanes remain available for transferring PCIe traffic. By idling some lanes during low throughput data traffic scenarios, the L0p state can reduce power consumption while active data communication can continue through the link.

In L0p, a link may have a partial width. In some cases, each direction of the link can have different widths. Therefore, flits can be sent at different widths over the link. The link can exit to other link states, such as a low power link state (e.g., L1) based on certain received and sent messages or other events. In FLIT mode, however, the standby state L0s is not available according to the current PCIe specification. In that case, the transition to the power-saving state (e.g., L1) from L0p needs to wait until the L1 state inactivity timer is triggered.

L0ps State in FLIT Mode

In some aspects, a new partial width standby link state 432 (L0ps) is available when the link is in FLIT mode. When the link is in FLIT mode, L0ps provides a low-power standby state that has lower latency than L1. In L0p, when any RX line or TX line of the link becomes idle or inactive (e.g., for a short time interval between data bursts or a predetermined threshold), the idle RX/TX line(s) can change from L0p to the new standby state L0ps which is accessible only from L0p when FLIT mode is enabled. The RX line and TX line of a lane can enter the L0ps state independently. In some aspects, there is a separate L0p/L0ps transition state diagram for each line such that the RX line and TX line of a lane can switch between the L0p and L0ps states independently.

In some aspects, L0ps is a low power state that allows a PCIe link to quickly enter and recover from without going through recovery. The lines of a PCIe link can enter and exit the L0ps state independently. For example, a line transmitter (e.g., drivers 320-1 to **320-*n*) and a line receiver (e.g., receivers 340-1 to 340-*n***) can stop or lower its clock rate (e.g., using dynamic clock gating) to reduce power consumption when the RX/TX line is in L0ps. In some aspects, a PCIe device controls its transmitter to enter L0ps and transmit an ordered set (e.g., EIOS), and a receiver enters L0ps after receiving the ordered set from the transmitter. In some aspects, a device (e.g., endpoint) can transition the data link from L0p to L0ps without obtaining permission from a PCIe host. In contrast, a transition to L1 involves the device (e.g., endpoint) first requesting permission from an upstream device (e.g., a host) to enter the deeper power conservation L1 state. Upon acknowledgment, both devices can turn off their transmitters and enter electrical idle in the L1 state.

Figure 5:
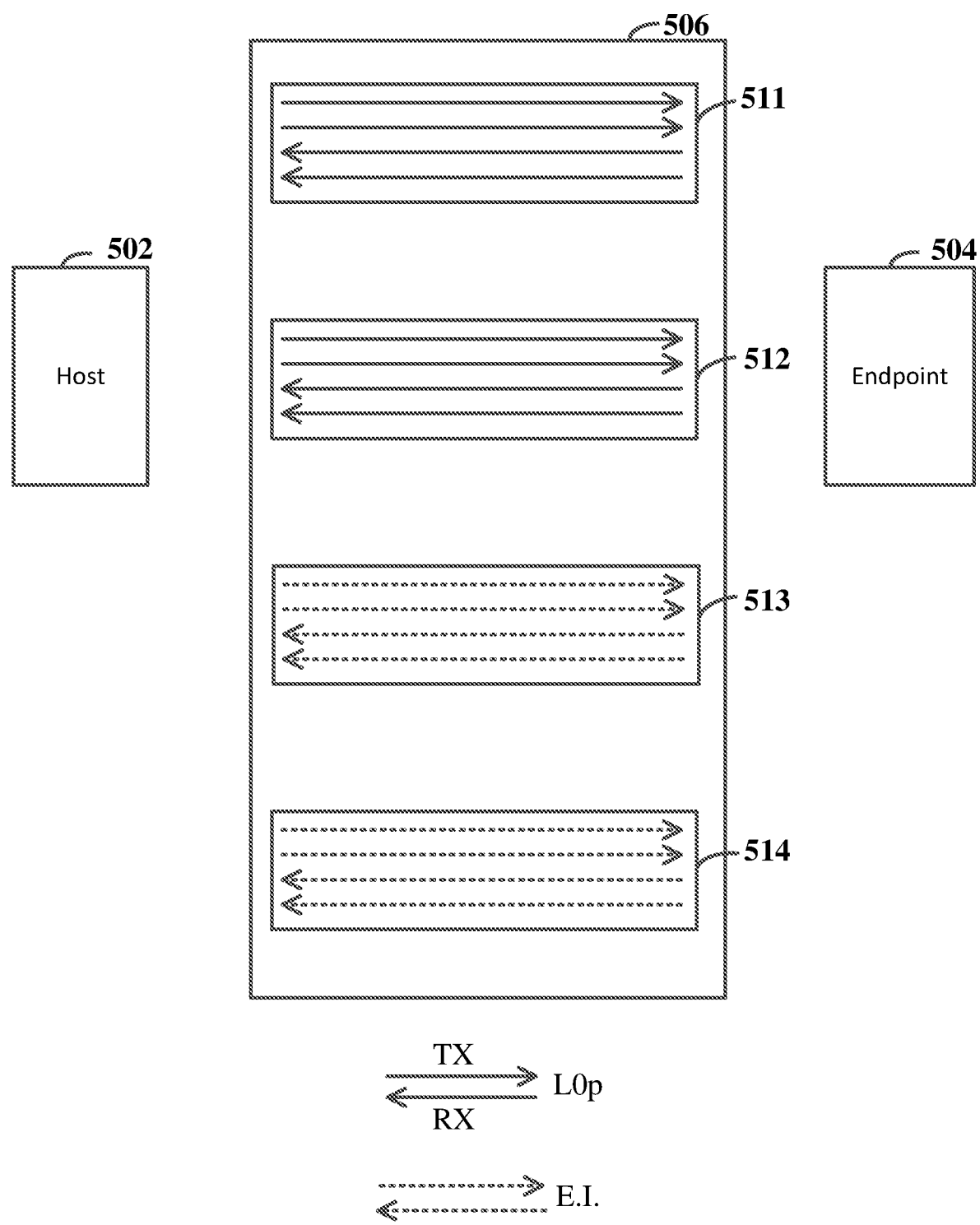
FIG. 5 is a diagram illustrating a multi-lane PCIe link between a host and an endpoint according to aspects of the present disclosure.

FIG. 5 is a diagram of a PCIe link between a host 502 and an endpoint 504 according to some aspects. The link 506 includes multiple duplex traffic lanes that may have the same physical structure as described in relation to FIG. 3 but are generalized to show four lanes in an exemplary x4 configuration. For example, the link 506 can include four lanes 511, 512, 513, 514, although more or fewer lanes may be used. Each lane includes two transmit (TX) lines (TX signal lines) as a differential line pair and two receive (RX) lines (RX signal lines) as a differential line pair. In this example, the link 506 has four lines per lane. In FIG. 5, TX lines carry traffic in the direction from the host 502 to the endpoint 504, and RX lines carry traffic in the direction from the endpoint 504 to the host 502. Based on the example in FIG. 3, the PHY TX block 222 shown in FIG. 2 may be implemented to include a transmit driver for each differential pair of TX lines, and the PHY RX block 270 shown in FIG. 2 may be implemented to include a receiver for each differential pair of RX lines.

In L0p, the width of the link 506 can be changed by controlling the number of lanes 511, 512, 513, 514 that are active and/or idle without interrupting the data flow (i.e., always keeping at least one lane active while changing link width). The host 502 or the endpoint 504 may change the link width by configuring the number of traffic lanes that are powered to transmit and receive data through the link L0p is a partial width state in which some lanes (e.g., lanes 511 and 512) can be active and some lanes (e.g., lanes 513 and 514) can be electrically idle (E.I.). In L0p, the active lanes 511 and 512 can be used to transmit and/or receive traffic, and the E.I. lanes are not used (idle). If both TX traffic and/or RX traffic are low or if there is no traffic activity over the active lanes, then one or more RX and/or TX lines may be put in the L0ps state (standby state) to reduce the power consumption of the link.

Figure 6:
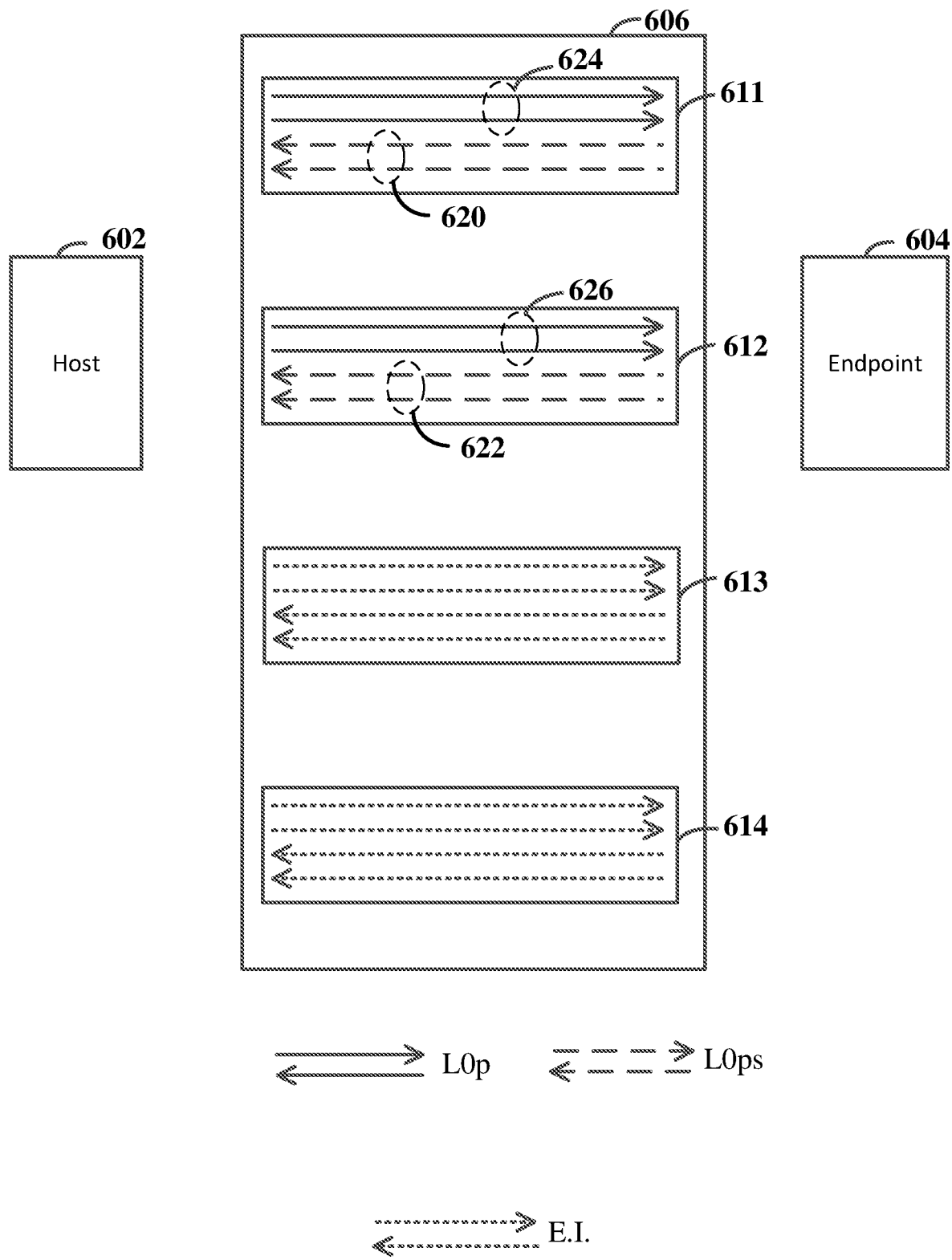
FIG. 6 is a diagram illustrating a first example of a PCIe link operating in a Flow Control Unit (FLIT) mode between a host and an endpoint according to some aspects of the present disclosure.

FIG. 6 is a diagram illustrating an example of a PCIe link operating in FLIT mode between a host 602 and an endpoint 604 according to some aspects. The host 602 and endpoint 604 may be the same as the host 502 and endpoint 504 in FIG. 5. The link 606 may have four lanes 611, 612, 613, 614 similar to the PCIe link 506 described above in FIG. 5. In one example, lanes 611 and 612 may be active lanes in the L0p state, and lanes 613 and 614 are electrically idle (E.I.). Due to low or no RX activity, RX lines 620 of lane 611 and RX lines 622 of lane 612 can change to the L0ps state to reduce link power consumption. In this case, the TX lines 624 of lane 611 and TX lines 626 of lane 612 remain in the L0p state for PCIe traffic. In some aspects, the transmitter (e.g., host 602/endpoint 604) may use an inactivity timer or threshold for determining the timing to change a line to the L0ps state due to low traffic or inactivity. In one aspect, when the inactivity timer expires or is triggered, the transmitter (e.g., endpoint 604) can transmit an EIOS on the corresponding lane and enter L0ps, and the receiver (e.g., host 602) can enter L0ps after receiving the EIOS on the corresponding lane. The RX and TX lines of the same lane can enter L0ps independently based on different inactivity timers (e.g., RX inactivity timer and TX inactivity timer). Similarly, the RX and TX lines can go back to the L0p state independently.

Figure 7:
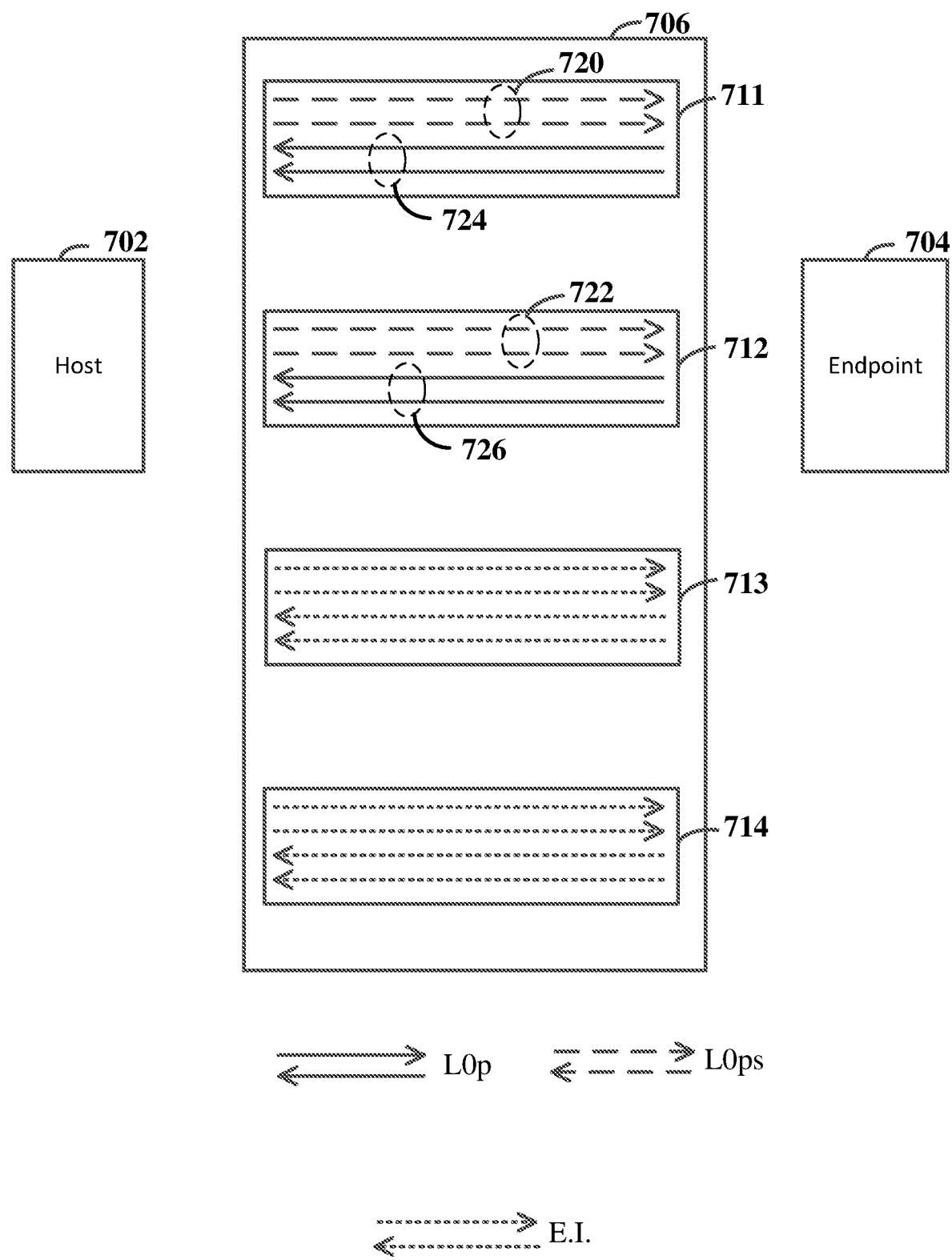
FIG. 7 is a diagram illustrating a second example of a PCIe link operating in the FLIT mode between a host and an endpoint according to some aspects of the present disclosure.

FIG. 7 is a diagram illustrating another example of a PCIe link operating in FLIT mode between a host 702 and an endpoint 704 according to some aspects. The host 702 and endpoint 704 may be the same as the hosts and endpoints in FIGS. 5 and 6. The link 706 between the host 702 and endpoint 704 may have four lanes 711, 712, 713, and 714. In one example, lanes 711 and 712 may be active lanes in the L0p state, and lanes 713 and 714 are electrically idle (E.I.). Due to low or no TX traffic, TX lines 720 of lanes 711 and TX lines 722 of lane 712 can be put in the L0ps state to reduce link power consumption. The RX lines 724 of lane 711 and RX lines 726 of lane 712 remain in the L0p state for PCIe traffic. In some aspects, a transmitter (e.g., host 702/endpoint 704) may use an inactivity timer or threshold for determining the timing to change a line to the L0ps state due to low traffic or inactivity. When the inactivity timer expires or is triggered, the transmitter (e.g., host 702 or endpoint 704) can transmit an EIOS on the corresponding lane and enters L0ps, and the receiver (e.g., endpoint 704) can enter L0ps after receiving the EIOS on the corresponding lane. The RX and TX lines of the same lane can enter L0ps independently. The RX and TX lines of the same lane can enter L0ps independently based on different inactivity timers (e.g., RX inactivity timer and TX inactivity timer).

The new L0ps state described above can provide power savings for a PCIe link in FLIT mode (e.g., in L0p state) even when TX or RX line alone is idle. Because the line can go to L0ps without handshaking (unlike a transition to L1) between the host and endpoint, the overhead of a handshake sequence can be avoided. Therefore, the transition between L0ps and L0p states can provide significant overhead power saving over a period of time. Further, the L0ps state power saving can scale with increased link width. In comparison to L1, the L0ps state can provide lower latency (e.g., exit latency) because the transition from L0ps to L0p does not need to go through a recovery state that involves exchanging training sequences to negotiate various link parameters, including for example lane polarity, link/lane numbers, equalization parameters, data rate, and so on.

PCIe Capability Structure

Figure 8:
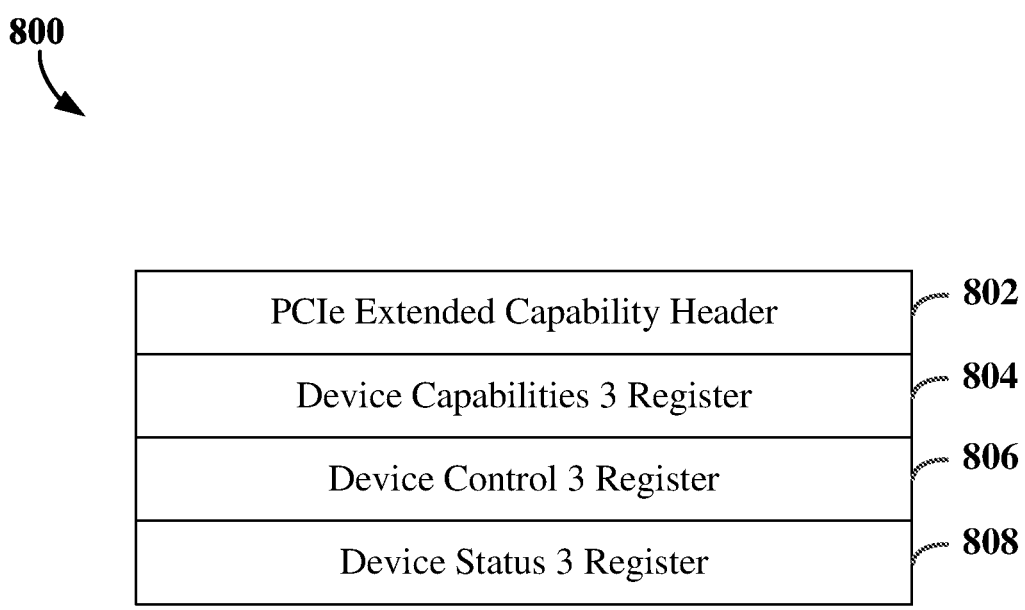
FIG. 8 is a diagram illustrating a PCIe configuration space structure according to some aspects of the disclosure.

In some aspects, the configuration and control of PCI devices (e.g., hosts and endpoints) can be performed using a set of registers referred to as configuration space in the PCIe specification. PCIe devices can have an extended configuration space providing additional registers. FIG. 8 is a diagram illustrating an exemplary PCIe configuration space (e.g., Device 3 Extended Capability Structure) according to some aspects. The Device 3 Extended Capability Structure 800 can be configured to support the implementation of the new standby state L0ps described above in relation to FIGS. 4-7. The Device 3 Extended Capability Structure 800 can include a PCIe extended capability header 802, a device capabilities 3 register 804, a device control 3 register 806, and a device status 3 register 808.

Figure 9:
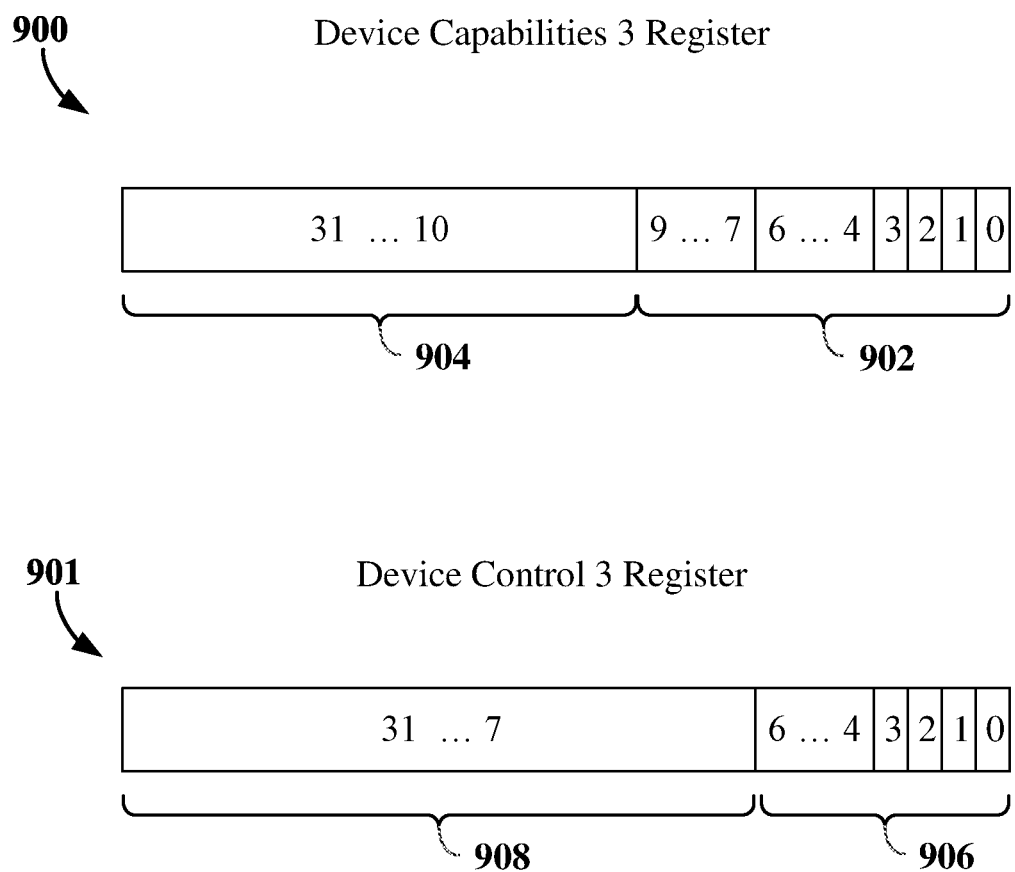
FIG. 9 is a diagram illustrating exemplary PCIe registers according to aspects of the present disclosure.

FIG. 9 is a diagram illustrating a device capabilities 3 register 900 and a device control 3 register 901 according to some aspects. The device capabilities 3 register 900 and device control 3 register 901 may be the same as those included in the Device 3 Extended Capability Structure 800 of FIG. 8. The device capabilities 3 register can have 32 bits in which some bits 902 (e.g., bits 0-9) are configured for various functions according to the current PCIe specification. For example, bit 3 can indicate whether or not L0p is supported by a receiver, bits 4-6 can indicate the port L0p exit latency, and bits 7-9 can indicate the retimer L0p exit latency. The device capabilities 3 register also has reserved bits 904 (e.g., bits 10-31) that can be used to implement new features such as the new L0ps state described above in relation to FIGS. 4-7. In one example, bit 10 can be used to indicate whether L0ps is supported or not, and bits 11-12 can provide the L0ps exit latency value. L0ps exit latency specifies the latency to exit the L0ps state (e.g., go back to L0p).

The device control 3 register 901 can have 32 bits in which some bits 906 (e.g., bits 0-6) are configured for various functions in the current PCIe specification. For example, bit 3 can indicate whether L0p state is enabled or not. The device control 3 register also has reserved bits 908 (e.g., bits 7-31) that can be used to implement new features such as the L0ps state described above in relation to FIGS. 4-7. In one example, bit 7 can be used to indicate whether L0ps is enabled or not (e.g., 1 for enabled, 0 for disabled).

Figure 10:
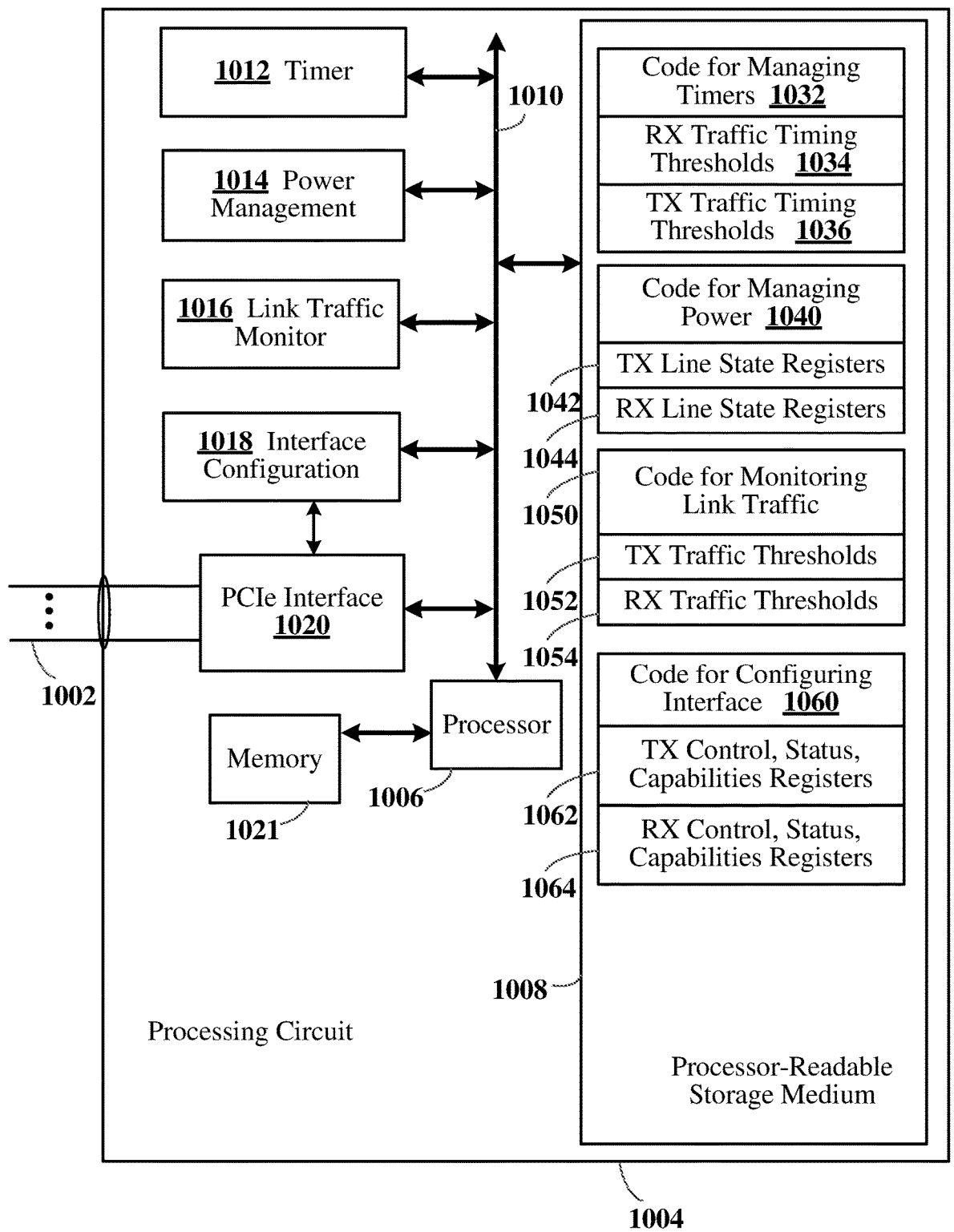
FIG. 10 is a block diagram of a PCIe link interface processing circuit according to aspects of the present disclosure.

FIG. 10 is a block diagram of a link interface processing circuit. The processing circuit 1004 is an apparatus that may be a part of a host or an endpoint. It is coupled to a link 1002, e.g., a PCIe link, with multiple duplex lanes similar to those described in relation to FIGS. 5-7. The link 1002 can be coupled at an opposite end to another PCIe device (e.g., an endpoint or a host). Data and control information communicated as packets through the link 1002 are coupled to a link interface 1020 (e.g., PCIe interface) which provides a PHY level interface to the link 1002 and converts baseband signals to packets. The data and control packets are sent through the link interface 1020 through a bus 1010 to other components of the processing circuit 1004. The link interface 1020 has a direct connection to interface configuration circuitry 1018 for configuration and control settings for the operation of the link 1002.

The processing circuit 1004 further includes a memory 1021 that can be used for storing data and information used by the processor during various operations. The processing circuit 1004 further includes timer circuitry 1012 that is coupled to the bus 1010. The timer circuitry 1012 can be configured for various timing-related functions, for example, timing for latency, inactivity, acknowledgment, and transition between PCIe states (e.g., L0, L0p, L0ps, L1, L2, and L3). The timer circuitry 1012 can access a computer-readable storage medium 1008 to access code for managing timers 1032. In some aspects, the storage medium is a non-transitory computer-readable medium. The timer circuitry 1012 may also access registers maintained in the storage medium 1008 (and/or memory 1021) that contain receive (RX) traffic timing thresholds 1034 and transmit (TX) traffic timing thresholds 1036, which can be used to determine transition timing between PCIe link states.

The processing circuit 1004 can further include power management circuitry 1014 that manages power to each line/lane of the link 1002 and to other components of the processing circuit 1004. The power management circuitry 1014 has access through the bus 1010 to code for managing PCIe power 1040 and to transmit line state registers 1042 and receive line state registers 1044. These registers may be used to store a state for each transmit line and each receive line, or for a transmit side of a link and a receive side of the link. The state may be determined using the code for managing timers 1032, the code for managing PCIe power 1040, or in another way.

The processing circuit 1004 can further include link traffic monitor circuitry 1016 that monitors the transmit and receive traffic activity on the link 1002. For example, link the traffic monitor circuitry 1016 can monitor traffic activity and traffic inactivity in order to determine the current link state and transition between link states. The link traffic monitor circuitry 1016 has access to code for monitoring link traffic 1050 in the storage medium 1008 and also to registers to store results and to obtain traffic activity thresholds. Transmit traffic activity thresholds 1052 and receive traffic activity thresholds 1054 can be used for monitoring transmit traffic activity and receive traffic activity, respectively.

The power management circuitry 1014 may manage power of the transmit lines and power of the receive lines in accordance with the transmit traffic activity and the receive traffic activity. The interface configuration circuitry 1018 may modify the configuration in response to the power management circuitry 1014. For example, the interface configuration circuitry 1018 can change the link state (e.g., L0, L0p, L0ps) of the link 1002.

The interface configuration circuitry 1018 is coupled to the bus 1010 as are the link traffic monitor circuitry 1016, power management circuitry 1014, and the timer circuitry 1012 so that each of these blocks may communicate with each other, with the storage medium 1008 and to a processor 1006. The processor 1006 can control the operation of the other components and instigates instances of each component or its function as appropriate to the operation of the processing circuit 1004. The interface configuration circuitry 1018 also has access to code for configuring the PCIe interface 1060. On executing this code, the interface configuration circuitry 1018 can read and write values from a variety of configuration registers. For example, these registers include TX control, status, and capabilities registers 1062 and RX control, status, and capabilities registers 1064. These registers may be accessed and read at the start of link initialization and then updated with the result of the initialization. The registers may also be modified in response to power management and bandwidth negotiations or to change the status of one or more transmit lines or receive lines of the link 1002.

In some aspects, the interface configuration circuitry 1018 and link interface 1020 can configure the link 1002 to use the L0p and L0ps link states in FLIT mode as described above. In some aspects, the link 1002 in L0p state can quickly enter (e.g., based on an L0ps inactivity timer, for example, maintained by the timer 1012) and recover from the L0ps state without going through a recovery state. In some aspects, the interface configuration circuitry 1018 and link interface 1020 can transmit or receive an electrical idle ordered set (EIOS) via the link 1002. The EIOS can cause the link to enter L0ps. In some aspects, when a lane of the link 1002 switches from L0ps back to L0p, the interface configuration circuitry 1018 and link interface 1020 can re-establish bit lock, symbol lock, or block alignment, and perform lane-to-lane de-skew. In one example, the interface configuration circuitry 1018 and link interface 1020 can de-skew the lane by sending exit patterns on the idle lanes to train and de-skew them. As one example, an exit pattern can include an electrical idle exit ordered set (EIEOS) and a fast training sequence (FTS).

The processing circuit 1004 may initialize the link 1002, manage the power, link state, and change the number of active lines of the link 1002. In operation, bandwidth requests may also be received from the host or endpoint. Bandwidth requests may cause a bandwidth negotiation followed by a change in values set to control, status, and capabilities registers. The number of active lines may then be changed in response to transmit traffic activity and receive traffic activity. The link traffic monitor circuitry 1016 also can monitor TX traffic activity for the transmit lines of the link 1002 and monitors RX traffic activity for the receive lines of the link 1002. The TX traffic activity and RX traffic activity are evaluated to determine a change of the number of active lines. The power management circuitry 1014 may change the link state of one or more TX or RX lines. The state change may then be recorded in TX line state registers 1042 and RX line state registers 1044. The evaluation may be performed in different ways. In some examples, the TX traffic activity is compared to one or more thresholds in TX traffic threshold registers 1052 and the RX traffic activity is compared to one or more thresholds in RX traffic threshold registers 1054 at the link traffic monitor circuitry 1016. A message may then be sent to the connected device (e.g., the host or endpoint) through the link 1002.

Upon changing the number of active lines or link state, the power management circuitry 1014 may change the voltage levels of one or more of the voltages 276, 278, and 280 by instructing the PMIC 290 to set the voltage levels of one or more of the voltages supplied by the PMIC 290 as shown in FIG. 2. The power management circuitry 1014 may also connect or disconnect power to drivers and receivers of affected lines in accordance with a new number of active lines. As an example, if the number of active lines is decreased, then the power management circuitry 1014 may power down the drivers in the PHY TX block 222 and/or the receivers in the PHY RX block 226 corresponding to the lines in the link 1002 that are being deactivated because of the change. The power management circuitry 1014 may power down selected drivers and/or receivers by sending instructions to a power switch circuit to turn off the selected drivers and/or receivers. So a power according to the negotiated bandwidth is managed by supplying one or more voltages to the interface circuit of the link and by setting the levels of the one or more voltages.

Figure 11:
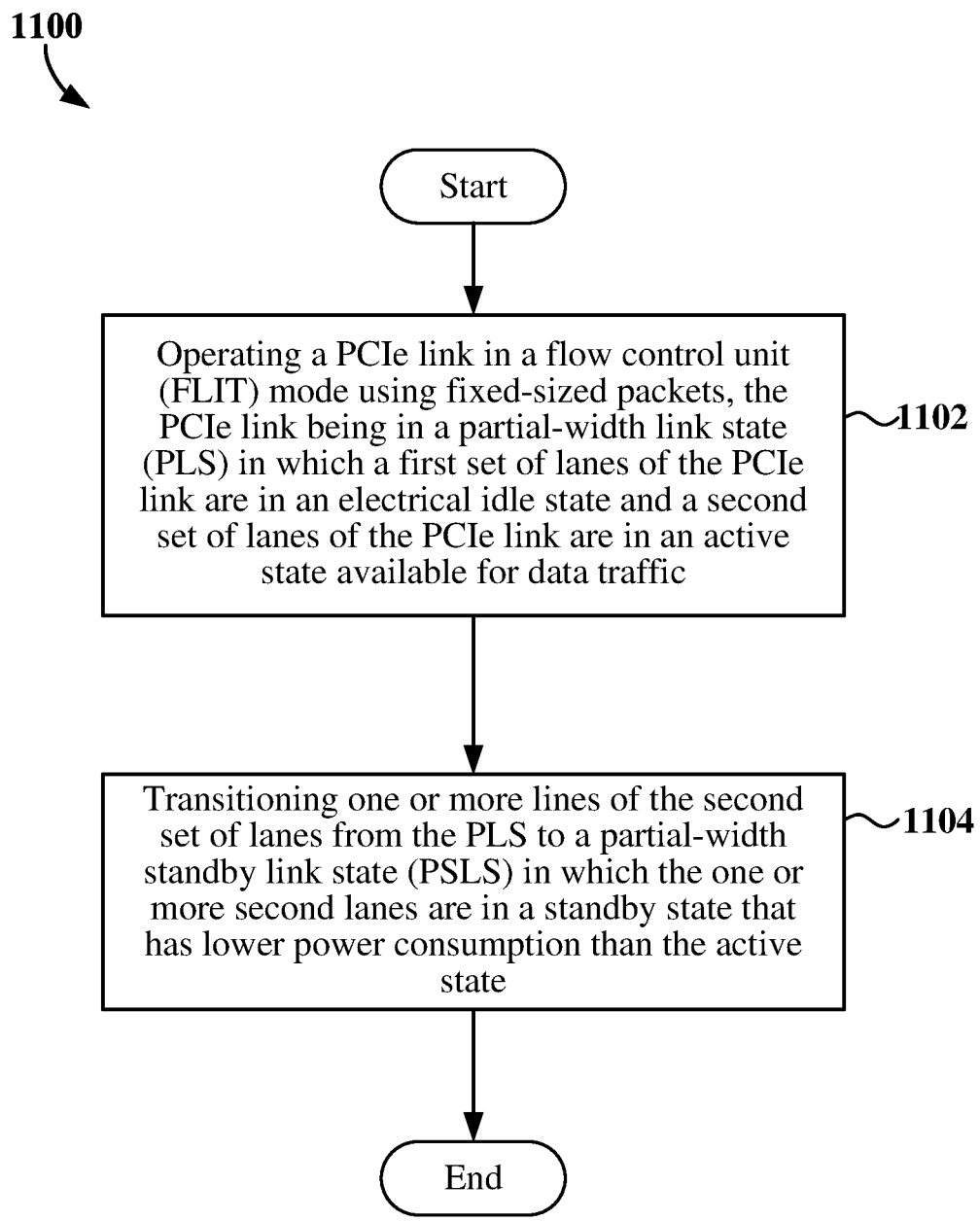
FIG. 11 is a flow diagram of an exemplary method for link state management of a PCIe link according to aspects of the present disclosure.

FIG. 11 illustrates a flow diagram of a method 1100 for link state management of a link, e.g., a PCIe link, according to aspects of the present disclosure. In certain aspects, the method 1100 provides techniques for link state management of a PCIe link operating in FLIT mode. As described herein the link can be a PCIe link, however, the method may be adapted to suit other data links with transmit lines and receive lines that operate in various link states. In some aspects, the method 1100 can be implemented at any of the hosts or endpoints described in.

At 1102, the method includes a process of operating a PCIe link (a data link with a host or endpoint) in a flow control unit (FLIT) mode using fixed-sized packets. The PCIe link is in a partial width link state (PLS) in which a first set of lanes of the PCIe link are in an electrical idle state and a second set of lanes of the PCIe link are in an active state available for carrying PCIe traffic to/from a host or endpoint. In some aspects, PLS can correspond to the L0p state of a PCIe link in FLIT mode as described herein. For example, the PCIe link may be the same as the link 506, 606, or 706, with some lanes (e.g., lanes 513, 514, 613, 614, 713, or 714) in the electrical idle state as in L0p. In one aspect, the interface configuration circuitry 1018 and PCIe interface 1020 can provide a means to operate the PCIe link in PLS using the FLIT mode.

At 1104, the method includes a process of transitioning one or more lines (e.g., Rx line(s) and/or Tx line(s)) of the second set of lanes from the PLS to a partial width standby link state (PSLS) in which the one or more lines of the second set of lanes are in a standby state that has lower power consumption than the active state. In some aspects, PSLS corresponds to the L0ps state of the PCIe link in FLIT mode. As described above in FIGS. 4-9, L0ps provides a lower power standby state from L0p when the link is in FLIT mode in which the other standby state L0s is not available. In one aspect, the interface configuration circuitry 1018 and PCIe interface 1020 can provide a means to transition the PCIe link between PLS and PSLS.

The following provides an overview of examples of the present disclosure.

Example 1 a method of operating an endpoint for data communication, comprising: operating a data link with a host in a flow control unit (FLIT) mode using fixed-sized packets, the data link being in a partial width link state (PLS) in which a first set of lanes of the data link are in an electrical idle state and a second set of lanes of the data link are in an active state available for data traffic with the host; and transitioning one or more lines of the second set of lanes from the PLS to a partial width standby link state (PSLS) in which the one or more lines of the second set of lanes are in a standby state that has lower power consumption than the active state.

Example 2 the method of example 1, further comprising: transitioning the one or more lines of the second set of lanes from the PSLS back to the PLS without going through a recovery state.

Example 3 the method of example 1, further comprising: receiving, from the host, an electrical idle ordered set via the data link; and transitioning the one or more lines of the second set of lanes from the PLS to the PSLS in response to the electrical idle ordered set.

Example 4 the method of example 1, further comprising transitioning the one or more lines of the second set of lanes from the PSLS to the PLS, comprising at least one of: establishing with the host at least one of bit lock, symbol lock, or block alignment of the data link; or de-skewing lane-to-lane skew of the data link.

Example 5 the method of example 1, 2, 3, or 4, wherein the one or more lines of the second set of lanes comprises a transmit signal line for transmitting a signal to the host and a receive signal line for receiving a signal from the host, and wherein the transitioning the one or more lines of the second set of lanes from the PLS to the PSLS comprises at least one of: transitioning the transmit signal line to the PSLS independent of the receive signal line; or transitioning the receive signal line to the PSLS independent of the transmit signal line.

Example 6 the method of example 5, wherein the transitioning the one or more lines of the second set of lanes from the PLS to the PSLS comprises: transitioning the transmit signal line to the PSLS based on a first inactivity timer; and transitioning the receive signal line to the PSLS based on a second inactivity timer that is independent of the first inactivity timer.

Example 7 the method of example 5, further comprising: transitioning the one or more lines of the second set of lanes from the PLS to the PSLS without obtaining permission from the host.

Example 8 the method of example 1, 2, 3, or 4, wherein the PLS comprises a peripheral component interconnect express (PCIe) L0p state configured to operate the data link in the FLIT mode using fixed-sized packets, and the PSLS comprises a PCIe L0ps state configured to operate the data link in the FLIT mode.

Example 9 an endpoint for a peripheral component interconnect express (PCIe) link comprising: an interface circuit configured to provide an interface with the PCIe link connected with a host; and a controller configured to: operate the PCIe link in a flow control unit (FLIT) mode using fixed-sized packets, the PCIe link being in a partial width link state (PLS) in which a first set of lanes of the PCIe link are in an electrical idle state and a second set of lanes of the PCIe link are in an active state available for data traffic with host; and transitioning one or more lines of the second set of lanes from the PLS to a partial width standby link state (PSLS) in which the one or more of the second set of lanes are in a standby state that has lower power consumption than the active state.

Example 10 the endpoint of example 9, wherein the controller is further configured to: transition the one or more lines of the second set of lanes from the PSLS back to the PLS without going through a recovery state.

Example 11 the endpoint of example 9, wherein the controller is further configured to: receive, from the host, an electrical idle ordered set via the PCIe link; and transition the one or more lines of the second set of lanes from the PLS to the PSLS in response to the electrical idle ordered set.

Example 12 the endpoint of example 9, wherein, to transition the one or more lines of the second set of lanes from the PSLS to the PLS, wherein the controller is further configured to: establish with the host at least one of bit lock, symbol lock, or block alignment of the PCIe link; or de-skew lane-to-lane skew of the PCIe link.

Example 13 the endpoint of example 9, 10, 11, or 12, wherein the one or more lines of the second set of lanes comprises a transmit signal line for transmitting a signal to the host and a receive signal line for receiving a signal from the host, and wherein, to transition the one or more lines of the second set of lanes PCIe link from the PLS to the PSLS, the controller is further configured to at least one of: transition the transmit signal line to the PSLS independent of the receive signal line; or transition the receive signal line to the PSLS independent of the transmit signal line.

Example 14 the endpoint of example 13, wherein, to transition the one or more lines of the second set of lanes from the PLS to the PSLS, the controller is further configured to: transition the transmit signal line to the PSLS based on a first inactivity timer; and transition the receive signal line to the PSLS based on a second inactivity timer that is independent of the first inactivity timer.

Example 15 the endpoint of example 13, wherein the controller is further configured to: transition the one or more lines of the second set of lanes from the PLS to the PSLS without obtaining permission from the host.

Example 16 the endpoint of example 9, 10, 11, or 12, wherein the PLS comprises a PCIe L0p state configured to operate the PCIe link in the FLIT mode using fixed-sized packets, and the PSLS comprises a PCIe L0ps state configured to operate the PCIe link in the FLIT mode.

Example 17 a host for a peripheral component interconnect express (PCIe) link, comprising: an interface circuit configured to provide an interface with the PCIe link connected with an endpoint; and a controller configured to: operate the PCIe link in a flow control unit (FLIT) mode using fixed-sized packets, the PCIe link being in a partial width link state (PLS) in which a first set of lanes of the PCIe link are in an electrical idle state and a second set of lanes of the PCIe link are in an active state available for data traffic with the endpoint; and transition one or more lines of the second set of lanes from the PLS to a partial width standby link state (PSLS) in which the one or more of the second set of lanes are in a standby state that has lower power consumption than the active state.

Example 18 the host of example 17, wherein, to transition the one or more lines of the second set of lanes from the PSLS to the PLS, wherein the controller is further configured to, at least one of: establish with the endpoint at least one of bit lock, symbol lock, or block alignment of the PCIe link; or de-skew lane-to-lane skew of the PCIe link.

Example 19 the host of example 17 or 18, wherein the one or more lines of the second set of lanes comprises a transmit signal line for transmitting a signal to the endpoint and a receive signal line for receiving a signal from the endpoint, and wherein, to transition the one or more lines of the second set of lanes from the PLS to the PSLS, the controller is further configured to at least one of: transition the transmit signal line to the PSLS independent of the receive signal line; or transition the receive signal line to the PSLS independent of the transmit signal line.

Example 20 the host of example 19, wherein, to transition the one or more lines of the second set of lanes from the PLS to the PSLS, the controller is further configured to: transition the transmit signal line to the PSLS based on a first inactivity timer; and transition the receive signal line to the PSLS based on a second inactivity timer that is independent of the first inactivity timer.

It is to be appreciated that the present disclosure is not limited to the exemplary terms used above to describe aspects of the present disclosure. For example, bandwidth may also be referred to as throughput, data rate or another term.

Although aspects of the present disclosure are discussed above using the example of the PCIe standard, it is to be appreciated that present disclosure is not limited to this example, and may be used with other standards.

The host clients 214, the host controller 212, the device controller 252 and the device clients 254 discussed above may each be implemented with a controller or processor configured to perform the functions described herein by executing software including code for performing the functions. The software may be stored on a non-transitory computer-readable storage medium, e.g., a RAM, a ROM, an EEPROM, an optical disk, and/or a magnetic disk, shows as host system memory 240, endpoint system memory 274, or as another memory.

Any reference to an element herein using a designation e.g. "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of operating an endpoint for data communication, comprising:
    operating a data link with a host in a flow control unit (FLIT) mode using fixed-sized packets, the data link being in a partial width link state (PLS) in which a first set of lanes of the data link are in an electrical idle state and a second set of lanes of the data link are in an active state available for data traffic with the host;
    detecting, using an inactivity timer, low traffic or inactivity on one or more lines of the second set of lanes; and
    transitioning, in response to detecting the low traffic or inactivity, the one or more lines of the second set of lanes from the PLS to a partial width standby link state (PSLS) without handshaking between the host and the endpoint, in the PSLS the one or more lines of the second set of lanes being in a standby state that has lower power consumption than the active state.

2. The method of claim 1, further comprising:
    transitioning the one or more lines of the second set of lanes from the PSLS back to the PLS without going through a recovery state.

3. The method of claim 1, further comprising:
    receiving, from the host, an electrical idle ordered set via the data link; and
    transitioning the one or more lines of the second set of lanes from the PLS to the PSLS in response to the electrical idle ordered set.

4. The method of claim 1, further comprising transitioning the one or more lines of the second set of lanes from the PSLS to the PLS, comprising at least one of:
    establishing with the host at least one of bit lock, symbol lock, or block alignment of the data link; or
    de-skewing lane-to-lane skew of the data link.

5. The method of claim 1, wherein the one or more lines of the second set of lanes comprises a transmit signal line for transmitting a signal to the host and a receive signal line for receiving a signal from the host, and
    wherein the transitioning the one or more lines of the second set of lanes from the PLS to the PSLS comprises at least one of:
        transitioning the transmit signal line to the PSLS independent of the receive signal line; or
        transitioning the receive signal line to the PSLS independent of the transmit signal line.

6. The method of claim 5, wherein the transitioning the one or more lines of the second set of lanes from the PLS to the PSLS comprises:
    transitioning the transmit signal line to the PSLS based on a first inactivity timer; and
    transitioning the receive signal line to the PSLS based on a second inactivity timer that is independent of the first inactivity timer.

7. The method of claim 5, further comprising:
    transitioning the one or more lines of the second set of lanes from the PLS to the PSLS without obtaining permission from the host.

8. The method of claim 1, wherein the PLS comprises a peripheral component interconnect express (PCIe) L0p state configured to operate the data link in the FLIT mode using fixed-sized packets, and the PSLS comprises a PCIe L0ps state configured to operate the data link in the FLIT mode.

9. An endpoint for a peripheral component interconnect express (PCIe) link comprising:
    an interface circuit configured to provide an interface with the PCIe link connected with a host; and
    a controller configured to:
        operate the PCIe link in a flow control unit (FLIT) mode using fixed-sized packets, the PCIe link being in a partial width link state (PLS) in which a first set of lanes of the PCIe link are in an electrical idle state and a second set of lanes of the PCIe link are in an active state available for data traffic with the host; and
        detect, using an inactivity timer, low traffic or inactivity on one or more lines of the second set of lanes; and
        transition, in response to detecting the low traffic or inactivity, the one or more lines of the second set of lanes from the PLS to a partial width standby link state (PSLS) without handshaking between the host and the endpoint, in the PSLS the one or more of the second set of lanes being in a standby state that has lower power consumption than the active state.

10. The endpoint of claim 9, wherein the controller is further configured to:
    transition the one or more lines of the second set of lanes from the PSLS back to the PLS without going through a recovery state.

11. The endpoint of claim 9, wherein the controller is further configured to:
    receive, from the host, an electrical idle ordered set via the PCIe link; and
    transition the one or more lines of the second set of lanes from the PLS to the PSLS in response to the electrical idle ordered set.

12. The endpoint of claim 9, wherein, to transition the one or more lines of the second set of lanes from the PSLS to the PLS, wherein the controller is further configured to:

establish with the host at least one of bit lock, symbol lock, or block alignment of the PCIe link; or de-skew lane-to-lane skew of the PCIe link.

13. The endpoint of claim 9, wherein the one or more lines of the second set of lanes comprises a transmit signal line for transmitting a signal to the host and a receive signal line for receiving a signal from the host, and wherein, to transition the one or more lines of the second set of lanes from the PLS to the PSLS, the controller is further configured to at least one of:

transition the transmit signal line to the PSLS independent of the receive signal line; or transition the receive signal line to the PSLS independent of the transmit signal line.

14. The endpoint of claim 13, wherein, to transition the one or more lines of the second set of lanes from the PLS to the PSLS, the controller is further configured to:

transition the transmit signal line to the PSLS based on a first inactivity timer; and transition the receive signal line to the PSLS based on a second inactivity timer that is independent of the first inactivity timer.

15. The endpoint of claim 13, wherein the controller is further configured to:

transition the one or more lines of the second set of lanes from the PLS to the PSLS without obtaining permission from the host.

16. The endpoint of claim 9, wherein the PLS comprises a PCIe LOp state configured to operate the PCIe link in the FLIT mode using fixed-sized packets, and the PSLS comprises a PCIe LOps state configured to operate the PCIe link in the FLIT mode.

17. A host for a peripheral component interconnect express (PCIe) link, comprising:

an interface circuit configured to provide an interface with the PCIe link connected with an endpoint; and a controller configured to:

operate the PCIe link in a flow control unit (FLIT) mode using fixed-sized packets, the PCIe link being in a partial width link state (PLS) in which a first set of lanes of the PCIe link are in an electrical idle state and a second set of lanes of the PCIe link are in an active state available for data traffic with the endpoint;

detect, using an inactivity timer, low traffic or inactivity on one or more lines of the second set of lanes; and transition the one or more lines of the second set of lanes from the PLS to a partial width standby link state (PSLS) without handshaking between the host and the endpoint, in the PSLS the one or more of the second set of lanes being in a standby state that has lower power consumption than the active state.

18. The host of claim 17, wherein, to transition the one or more lines of the second set of lanes from the PSLS to the PLS, wherein the controller is further configured to, at least one of:

establish with the endpoint at least one of bit lock, symbol lock, or block alignment of the PCIe link; or de-skew lane-to-lane skew of the PCIe link.

19. The host of claim 17, wherein the one or more lines of the second set of lanes comprises a transmit signal line for transmitting a signal to the endpoint and a receive signal line for receiving a signal from the endpoint, and wherein, to transition the one or more lines of the second set of lanes from the PLS to the PSLS, the controller is further configured to at least one of:

transition the transmit signal line to the PSLS independent of the receive signal line; or transition the receive signal line to the PSLS independent of the transmit signal line.

20. The host of claim 19, wherein, to transition the one or more lines of the second set of lanes from the PLS to the PSLS, the controller is further configured to:

transition the transmit signal line to the PSLS based on a first inactivity timer; and transition the receive signal line to the PSLS based on a second inactivity timer that is independent of the first inactivity timer.

\* \* \* \* \*